United States Patent
Schmidt

(10) Patent No.: US 11,341,672 B2
(45) Date of Patent: May 24, 2022

(54) METHOD AND DEVICE FOR DETECTING AN ANATOMICAL FEATURE OF A SECTION OF A BLOOD VESSEL

(71) Applicant: Siemens Healthcare GmbH, Erlangen (DE)

(72) Inventor: Sebastian Schmidt, Weisendorf (DE)

(73) Assignee: SIEMENS HEALTHCARE GMBH, Erlangen (DE)

(*) Notice: Subject to any disclaimer, the term of this patent is extended or adjusted under 35 U.S.C. 154(b) by 116 days.

(21) Appl. No.: 16/710,109

(22) Filed: Dec. 11, 2019

(65) Prior Publication Data

US 2020/0202557 A1 Jun. 25, 2020

(30) Foreign Application Priority Data

Dec. 20, 2018 (DE) .......................... 102018222606.7

(51) Int. Cl.
*G06K 9/00* (2022.01)
*G06T 7/73* (2017.01)
(Continued)

(52) U.S. Cl.
CPC ............... *G06T 7/73* (2017.01); *G06N 3/084* (2013.01); *G06T 7/0012* (2013.01); *G06T 7/11* (2017.01);
(Continued)

(58) Field of Classification Search
CPC ..................................................... G16H 50/50
See application file for complete search history.

(56) References Cited

U.S. PATENT DOCUMENTS

| 5,872,861 A * | 2/1999 | Makram-Ebeid ..... G06T 7/0012 |
| | | 382/130 |
| 6,377,832 B1 * | 4/2002 | Bergman ............... A61B 5/055 |
| | | 128/925 |

(Continued)

FOREIGN PATENT DOCUMENTS

| DE | 69428840 T2 | 7/2002 |
| EP | 3057510 B1 | 11/2018 |

(Continued)

OTHER PUBLICATIONS

Kheyfets, V. O. et al.: Considerations for Numerical Modeling of the Pulmonary Circulation—A Review With a Focus on Pulmonary Hypertension; in: Journal of Biomechanical Engineering; vol. 135; pp. 061011-1-061011-15; 2013; DOI: 10.1115/1.4024141.

(Continued)

*Primary Examiner* — Hadi Akhavannik
(74) *Attorney, Agent, or Firm* — Harness, Dickey & Pierce, P.L.C.

(57) ABSTRACT

A method and a device are for detecting an anatomical feature of a section of a blood vessel. In an embodiment, the device includes a first interface embodied to receive a medical image data record, including a region of an anatomy of a patient to be examined, which has the section of a blood vessel; a first computing unit, embodied to apply a first algorithm pretrained on an anatomical feature for detecting the anatomical feature based upon the medical image data record; and a second interface embodied to provide an item of information based upon the detection of the anatomical feature. The anatomical feature includes a change in caliber of a blood vessel. Further, the presence of the anatomical feature is indicative of vascular pulmonary disease, in particular of chronic thromboembolic pulmonary hypertension.

17 Claims, 3 Drawing Sheets

(51) Int. Cl.
*G06N 3/08* (2006.01)
*G06T 7/00* (2017.01)
*G06T 7/11* (2017.01)

(52) U.S. Cl.
CPC .............. *G06T 2207/20084* (2013.01); *G06T 2207/20112* (2013.01); *G06T 2207/30101* (2013.01)

(56) References Cited

U.S. PATENT DOCUMENTS

| | | | |
|---|---|---|---|
| 7,912,266 B2 | 3/2011 | Fahmi et al. | |
| 8,023,711 B2 | 9/2011 | Scheuering et al. | |
| 9,538,925 B2 | 1/2017 | Sharma et al. | |
| 2011/0021928 A1* | 1/2011 | Giovangrandi | A61B 5/0205 600/484 |
| 2012/0078099 A1* | 3/2012 | Suri | A61B 8/0891 600/440 |
| 2013/0246034 A1* | 9/2013 | Sharma | A61B 6/503 703/11 |
| 2014/0254900 A1* | 9/2014 | Sturm | A61B 5/0035 382/128 |
| 2017/0020435 A1* | 1/2017 | Lovoi | A61B 5/7282 |
| 2017/0132788 A1* | 5/2017 | Venugopal | A61B 5/0285 |
| 2017/0161437 A1* | 6/2017 | Weinstein | G16H 70/20 |
| 2017/0330075 A1* | 11/2017 | Tuysuzoglu | G16H 50/50 |
| 2018/0042569 A1* | 2/2018 | Sakaguchi | A61B 6/032 |
| 2018/0153495 A1* | 6/2018 | Itu | G16H 30/40 |
| 2018/0350074 A1 | 12/2018 | Schmidt | |

FOREIGN PATENT DOCUMENTS

| | | |
|---|---|---|
| EP | 3409187 A1 | 12/2018 |
| WO | WO 2018202541 A1 | 11/2018 |

OTHER PUBLICATIONS

German Office Action dated Nov. 15, 2019.

* cited by examiner

METHOD AND DEVICE FOR DETECTING AN ANATOMICAL FEATURE OF A SECTION OF A BLOOD VESSEL

PRIORITY STATEMENT

The present application hereby claims priority under 35 U.S.C. § 119 to German patent application number DE 102018222606.7 filed Dec. 20, 2018, the entire contents of each of which are hereby incorporated herein by reference.

FIELD

Embodiments of the invention generally relate to a method and a device for detecting an anatomical feature of a section of a blood vessel. Embodiments of the invention further generally relate to a method for adjusting an algorithm pretrained on an anatomical feature. Moreover, embodiments of the invention generally relate to a computer program implementing the inventive method and to a data carrier having the computer program.

BACKGROUND

Vascular diseases, in particular chronic pulmonary vascular diseases, represent a significant problem. Since, unlike acute pulmonary embolisms, they remain symptom-free for a long time, they are often diagnosed too late when the lungs and/or the right side of the heart are already irreversibly damaged. In the x-ray image, MRT image or CT image, they leave behind features which are often not identified because the illnesses are relatively rare and most radiologists lack experience in this regard.

Therefore, chronic thromboembolic pulmonary hypertension (CTEPH) is in particular characterized by the repeated influx of thrombi into the lung arteries, in other works pulmonary embolisms. These then block and narrow the vessels completely or partially and remodel them with fibrous connective tissue. Pulmonary hypertension often develops with a poor prognosis. The diagnostic method currently recognized comprises measuring the pressure in the pulmonary artery using a heart catheter examination, which is invasive and complicated, however.

It is known to examine the flow and pressure ratios in blood vessels, e.g. pulmonary arteries, on the basis of medical image data by way of flow simulation (see e.g. EP 3409187 A1 or Kheyfets et al. "Considerations for numerical modeling of the pulmonary circulation—a review with a focus on pulmonary hypertension." J Biomech Eng. 2013 June; 135(6):61011-15. doi: 10.1115/1.4024141). This generally also only takes place, however, once pulmonary vascular disease has been determined in a patient.

Recently systems which use algorithms from the field of artificial intelligence, e.g. classifiers, machine learning, neural networks and other algorithms used in the field of artificial intelligence, in particular also what are known as deep learning networks which have an input layer, layers with nodal points arranged therebetween (hidden layers) and an output layer, are being used increasingly in the analysis of medical image data. These deep learning algorithms achieve very good recognition rates. In this context a neural network is trained by way of back propagation—to this end pairs of input data (typically radiological images) and output data (typically diagnoses or specific features to be identified) are used as training data and are fed into the input and output layer of the network. Weighting factors for the strength of the connection of the various neurons then appear as a result of back propagation of the output layer to the input layer. If the neural network is completely trained, images with an unknown diagnosis are fed into the input layer, whereon a signal appears on the output layer, which corresponds to the diagnosis or specifies a value which is indicative of the presence of a feature to be identified, on which the neural network was trained. A trained neural network of this type can also be understood to mean a trained algorithm or a trained (mathematical) function.

SUMMARY

The inventors have discovered that such methods cannot be used or only to a limited degree for rare diseases, since they require a very large number of training data records in order to achieve a good recognition rate, typically a few thousand up to millions of data records. This renders their use in rare diseases difficult or impossible, since an adequate number of data records, to which a correct diagnosis is also assigned, is simply not available. Moreover, the diagnoses are frequently not correct, which hampers the training even further.

Embodiments of the present invention specifies a method and a device which can be used to detect a feature, which is indicative of the presence of a vascular disease, in particular a CTEPH disease, and enable an improved diagnosis of the CTEPH disease.

Further advantageous and in part per se inventive embodiments and developments of the invention are presented in the claims and the description which follows. The method can be a computer-implemented method, in particular.

Inventive solutions are in embodiments described below, both in relation to the claimed devices and also in relation to the claimed method. Features, advantages or alternative embodiments mentioned herein are also transferable similarly to the other claimed subject matter and vice versa. In other words, the objective claims (which are directed, for example, to a device) can also be further developed with the features described or claimed in conjunction with a method. The corresponding functional features of the method are thereby provided by corresponding physical modules.

Furthermore, embodiments of the inventive solutions are described both in relation to methods and devices for detecting an anatomical feature of a section of a blood vessel and also in relation to methods and devices for adjusting a trained algorithm or a trained function. In this regard, features and alternative embodiments of data structures and/or algorithms in methods and devices for detecting an anatomical feature of a section of a blood vessel can be transferred to analog data structures and/or algorithms/functions in methods and devices for adjustment purposes. Analog data structures can be characterized here in particular by the use of the prefix "training". Furthermore, the trained algorithm/trained function used in methods and devices to detect an anatomical feature of a section of a blood vessel may have been adjusted and/or provided in particular by methods and devices for adjusting the trained algorithm/the trained function.

At least one embodiment of the invention relates to a method for detecting an anatomical feature of a section of a blood vessel, comprising:

providing a medical image data record, including a region to be examined of an anatomy of a patient, which has a section of a blood vessel;

applying a first algorithm pretrained on the anatomical feature in order to detect the anatomical feature on the basis of the medical image data record; and providing an item of information which is based on the detection of the anatomical feature;

wherein the anatomical feature comprises a change in caliber of a blood vessel.

At least one embodiment of the invention further relates to a method for adjusting a first algorithm pretrained on an anatomical feature, comprising:

firstly receiving the first algorithm pretrained on an anatomical feature via a training interface;

secondly receiving, via the training interface, a first training data record which comprises image data of a blood vessel with a change in caliber;

thirdly receiving, via the training interface, a second training data record which includes image data of a blood vessel without a change in caliber; and adjusting the first algorithm, pretrained on an anatomical feature, based upon a comparison of the first training data record and the second training data record, via a training computing unit.

At least one embodiment of the invention further relates to a device for detecting an anatomical feature of a section of a blood vessel, having the following features:

a first interface embodied to receive a medical image data record, comprising a region of an anatomy of a patient to be examined, which has a pulmonary artery;

a first computing unit, embodied to apply a first algorithm pretrained on an anatomical feature in order to detect the anatomical feature based upon the medical image data record; and a second interface embodied to provide an item of information, based on the detection of the anatomical feature;

wherein the anatomical feature comprises a change in caliber of a blood vessel.

At least one embodiment of the invention further relates to a training device for adjusting a pretrained algorithm for detecting an anatomical feature of a section of a blood vessel comprising a training interface embodied to firstly receive the pretrained algorithm, further embodied to secondly receive, via the training interface, a first training data record which comprises image data of a blood vessel with a change in caliber, further embodied to thirdly receive, via the training interface, a second training data record which comprises image data of a blood vessel without a change in caliber. The training system further has a training computing unit, embodied to adjust the first algorithm pretrained on an anatomical feature based upon a comparison of the first training data record and the training data record.

The devices of at least one embodiment of the invention can in particular be a computer, a microcontroller or an integrated circuit. Alternatively, they can be a cluster or cloud of computers.

An interface or training interface can be a hardware or software interface (for instance PCI bus, USB or Firewire) in at least one embodiment. A computing unit or training computing unit can have hardware elements or software elements, for instance a microprocessor or what is known as an FPGA (Field Programmable Gate Array).

At least one embodiment of the invention relates further to a computer program product with a computer program, which can be loaded directly into a memory of a device for detecting an anatomical feature of a section of a blood vessel and/or a training device for adjusting a first algorithm pretrained on an anatomical feature, having program sections in order to carry out all steps of the inventive method for detecting an anatomical feature of a section of a blood vessel and/or in order to carry out an embodiment of the inventive method for adjusting a first algorithm pretrained on an anatomical feature, when the program sections are carried out by the device and/or the training device.

A memory can be realized as a Random Access Memory (RAM) or as a permanent mass storage unit (hard disk, USB stick, SD card, solid state disk). According to at least one embodiment of the invention, the device or the training device can optimally further comprise an input and output unit, wherein an input and output unit comprises at least one input unit and/or at least one output unit.

The device and the training device according to at least one embodiment of the invention can be embodied as a shared system or be connected by way of a network. Furthermore, the communication between the device and the training device can also take place offline, for instance by exchanging data carriers. Communication between the device and the training device can consist, for instance, in the device transmitting further training data to the training device, or the training device transmitting the trained or further adjusted algorithm to the device. Furthermore, the device and the training device can be connected to other data sources or networks, in particular to a local or distributed PACS (Picture Archiving and Communication System), RIS (Radiology Information System) or HIS (Hospital Information System).

A network can be a local area network (LAN) or a wide-area network (WAN). One example of a local area network is an intranet, one example of a wide-area network is the internet. The network NETW can in particular also be embodied wirelessly, in particular as a wireless LAN (WLAN) or in brief WiFi, or as a Bluetooth connection. The network can also be embodied as a combination of the cited examples.

At least one embodiment of the invention further relates to a computer-readable storage medium, on which program sections which can be read and carried out by a computer are stored, in order to carry out all the method of at least one embodiment, when the program sections are carried out in a computer.

BRIEF DESCRIPTION OF THE DRAWINGS

The invention and further advantageous embodiments according to the features of the claims will now be described in greater detail on the basis of example embodiments illustrated schematically in the figures, but without any restriction of the invention to these example embodiments arising therefrom, which show:

DETAILED DESCRIPTION OF THE EXAMPLE EMBODIMENTS

Figure 1:
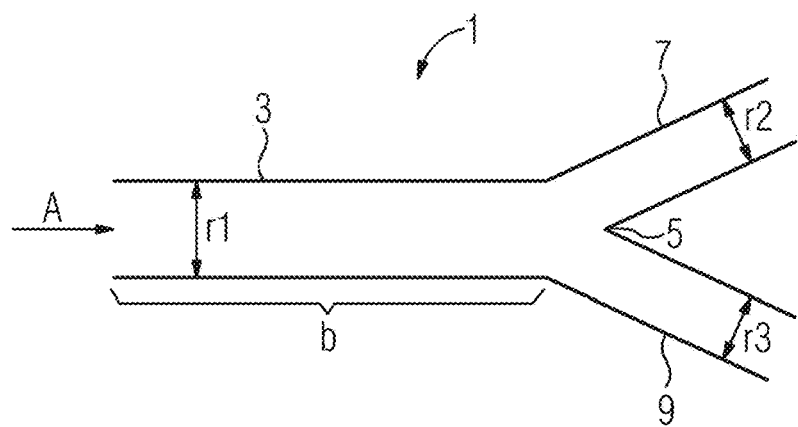
FIG. 1 a schematic diagram of a normal blood vessel.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.)

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (procesor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules.

Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards;

and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

At least one embodiment of the invention relates to a method for detecting an anatomical feature of a section of a blood vessel, comprising:

providing a medical image data record, including a region to be examined of an anatomy of a patient, which has a section of a blood vessel;

applying a first algorithm pretrained on the anatomical feature in order to detect the anatomical feature on the basis of the medical image data record; and providing an item of information which is based on the detection of the anatomical feature;

wherein the anatomical feature comprises a change in caliber of a blood vessel.

A medical image data record is a set of image data which maps at least one subarea of the anatomy of a patient and which was detected with an imaging modality, for instance a computed tomography device (CT device or CT scanner), a nuclear spin tomography device (known as MR scanner) or another device in medical imaging.

The terms "trained algorithm" and "trained function" are used synonymously below. A trained algorithm or a trained function maps input data onto output data. In this regard the output data can depend in particular on one or more parameters of the trained function. The one or more parameters of the trained function can be determined and/or adjusted by a training. The determination and/or the adjustment of the one or more parameters of the trained function can be based in particular on a pair of training input data and associated training mapping data, wherein the trained function for generating training output data is applied to the training input data. In particular, the determination and/or the adjustment can be based on a comparison of the training mapping data and the training output data. In general, a trainable algorithm/a trainable function, i.e. an algorithm or a function with as yet unadjusted one or more parameters, can also be referred to as "trained". Other terms for a trained algorithm or for a trained function are trained mapping rule, mapping rule with trained parameters, function with trained parameters, algorithm based on artificial intelligence, machine learning algorithm. One example of this is an artificial neural network, wherein the edge weights of the artificial neural network correspond to the parameters of the trained algorithm or the trained function. Instead of the term "neural network", the term "neural net" can also be used. In particular, a trained function can also be a deep artificial neural network or deep neural network. A further example of a trained function is a support vector machine, furthermore in particular other machine learning algorithms can also be used as a trained function.

At least one embodiment of the inventive method makes it possible for the sought feature to be detected with minimal, in particular without additional constructive hardware effort compared with the prior art.

In an anatomical context a vessel refers to a tubular section of a conductor for bodily fluids, in particular for blood or lymph. A blood vessel therefore refers to a section of a blood-guiding, tubular hollow organ for conducting blood.

The term "caliber" refers to the internal diameter of a vessel or in the meaning of the present invention the internal diameter or the cross-sectional surface of the free lumen of the vessel.

According to one embodiment of the invention, the section of a blood vessel is a section of a pulmonary artery and the presence of the anatomical feature is indicative of a pulmonary vascular disease, in particular of a chronic thromboembolic pulmonary hypertension (CETPH).

A change in caliber refers to sudden change in the internal diameter or the free lumen of a blood vessel, in particular in a section of a blood vessel which is located in the blood flow direction upstream of a branching of the blood vessel and/or which has no branching within the section in which the change in caliber is located. In particular, within the context of the present invention, the term change in caliber is to mean a sudden or discontinuous change in the internal diameter or the free lumen downstream in the blood flow direction from a larger to a smaller internal diameter or free lumen. In particular, with a change in caliber within the meaning of the invention, the reduced internal diameter or the reduced lumen of a section of a blood vessel downstream in the blood flow direction will become constant or even smaller from the change in caliber but will not become bigger.

In accordance with at least one embodiment of the invention, an anatomical feature is detected based on the medical image data record and an item of information, which is based on the detection of the anatomical feature, is provided. This information can be provided for a user, e.g. via an output device (display, printer, data interface) or provided in a data memory or data network, in particular in a PACS, RIS or HIS.

Normally the caliber of vessels changes relatively regularly: The diameter initially remains almost constant until a branching of the vessel occurs. The caliber of the following two arteries is then smaller in that the total or entire cross-sectional surface of the following two arteries lies marginally above the cross-sectional surface of the artery out of which the blood comes. This ensures that the flow speed and blood pressure remain constant to certain degrees along the vascular course and can thus prevent damage to the vessel or blood clots.

Sudden changes in caliber are conversely characteristic of vascular diseases. One example is CTEPH (Chronic Thromboembolic Pulmonary Hypertension). These changes in caliber are also typical signs of the disease but are difficult for a radiologist to recognize using medical image data since the vessel is regularly only truncated in the individual slices of the recording.

According to one embodiment of the invention, the method further comprises segmenting a blood vessel in the medical image data record, wherein the first algorithm pretrained on the anatomical feature for detecting the anatomical feature is applied to image data relating to the segmented blood vessel. To this end, numerous alternative methods for segmenting blood vessels are known to the person skilled in the art, e.g. from U.S. Pat. No. 7,912,266 B2 or U.S. Pat. No. 8,023,711 B2, the entire contents of each of which is hereby incorporated herein by reference.

According to one embodiment of the invention, the pretrained algorithm is trained on the basis of a plurality of training data records, which comprise patient-based and/or synthetic image data, wherein at least one subset of the plurality of training data records comprises image data of a blood vessel with a change in caliber.

According to one embodiment of the invention, the training data records have image data relating to a segmented blood vessel. In order to improve the results of the method, according to this embodiment of the invention, vessels or the vascular trees in the region to be examined are preferably firstly segmented in the medical image data and the training is not carried out with the original data but instead with the segmented vessels or vascular trees.

According to one embodiment of the invention, the pretrained algorithm is trained on a plurality of training data records, which comprise synthetic image data, wherein the synthetic image data is based on patient-based image data of a blood vessel and wherein a change in caliber is inserted into the blood vessel. A change in caliber can be produced on the basis of a computer operation or calculation rule, in which at a specific point in the blood vessel the caliber in the flow direction downstream is reduced suddenly or discontinuously to a lower value.

In particular, the provision of a correspondingly trained algorithm is problematic since medical image data of patients with detected changes in caliber in blood vessels and/or with diagnosed pulmonary vascular diseases, in particular CTEPH diseases, is not available in large numbers. This is due to the correspondingly low prevalence of these diseases, or also to the diseased patient rarely being diagnosed correctly on the basis of the image data, since it is difficult for a radiologist to recognize changes in caliber in the image data.

According to one embodiment of the invention, a larger number of training data records is therefore produced synthetically, which contain randomly generated changes in caliber. This can take place by a normal (i.e. non-pathological) vessel or a corresponding vascular tree being assumed from a medical image data record, in other words for instance on the basis of medical image data of a healthy test person/patient. According to the random principle, one or more changes in caliber can then be built in at different points selected at random in the vessel or vascular tree for each further training data record. These synthetic training data records can be produced in a large number by a corresponding computer program, which, when it is carried out in a computer, produces changes in caliber based on an input data record, which, comprising one or more medical image data records, a normal (i.e. non-pathological) vessel or a corresponding vascular tree. The changes in caliber are preferably produced on the basis of a medical image data record which comprises a segmented vessel.

Thousands of training data records can be produced in this way. A corresponding algorithm can therefore be trained or adjusted further. In order to allow for an abstraction of individual patients, use is made here of data from a number of patients as a source of the input data record (in most cases, but not necessarily, normal findings) and a number of synthetic data records is generated from each input data record. In a typical implementation use is made e.g. of data from 1000 patients, in order then to produce 100 different synthetic vascular trees from each of these data records in each case.

An angiography data record of the lungs is preferably used as the medical image data record and was produced e.g. with a CT device, MR scanner or an angiography (DSA) device. A CT image data record can preferably be used for this, for instance. This can preferably involve in particular a dual energy or multienergy CT (DECT, MECT) image data record, in which image data of x-ray radiation with two or more different energy spectra is detected. The recordings are preferably carried out with contrast agent. The recordings are preferably carried out with contrast agent and a spectrally separating CT method (DECT or MECT) is used. This is advantageous in that vessels filled with contrast agent can be easily segmented by the spectral separation and can also differ from the possibly also calciferous thrombosis. In particular, the use directly of CT devices with direct-conversion energy-resolving detectors is very advantageous, because here a high temporal resolution without temporal offset is possible between the acquisition of the various energy levels.

These afore-cited different medical image data records are frequently produced in numerous radiological divisions and can be obtained in large numbers. In accordance with the invention, medical image data records of patients without chronic vascular diseases can be used as input data records.

According to one embodiment of the invention, vessels can be segmented in the medical image data record, as a result of which a first partial data record is produced, which comprises the segmented vessels. A second partial data record which comprises the tissue surrounding the vessels can be produced on the basis of the first partial data record.

For instance, in the case of a medical image data record, which comprises a region of the lungs, a first partial data record is produced which comprises the blood vessel system and a second partial data record is produced which comprises the lung parenchyma. The first partial data record is then used in order to generate further synthetic training data by artificially producing changes in caliber as described above and to fuse again with the second partial data record in order to form an overall data record which is then used as a fusion training data record for training the algorithm.

According to a further embodiment of the invention, a blood pressure parameter in the section of a blood vessel, in which the anatomical feature was detected, is on the basis of the medical image data record. According to this embodiment of the invention, a blood pressure parameter can be calculated for instance in a pulmonary artery affected by a change in caliber, said pulmonary artery being identifiable by the inventive method, e.g. a blood pressure, a blood pressure ratio, a flow rate, a flow speed, a flow ratio etc. The blood pressure parameter can be determined with a flow calculation based on the medical image data, for instance, e.g. by way of computational fluid dynamics, as known to the person skilled in the art (see e.g. EP 3409187 A1 or Kheyfets et al. "Considerations for numerical modeling of the pulmonary circulation—a review with a focus on pulmonary hypertension." J Biomech Eng. 2013 June; 135(6): 61011-15. doi: 10.1115/1.4024141), the entire contents of which are hereby incorporated herein by reference. Alternatively, the blood pressure parameter can be determined by using a further pretrained algorithm, as known to the person skilled in the art, see e.g. EP3057510 B1, the entire contents of which are hereby incorporated herein by reference.

According to a further embodiment of the invention, the method further comprises segmenting the right atrium of the heart in the medical image data record and the step of determining a blood pressure parameter in the right atrium and the step of determining whether the blood pressure parameter is within a predetermined range, which is indicative of a pulmonary vascular disease, in particular a chronic thromboembolic pulmonary hypertension. As already described, flow and pressure ratios can be calculated on the basis of the medical image data record, e.g. by applying fluid flow simulations or a further correspondingly pretrained algorithm.

According to this embodiment of the invention, the method can further comprise determining, which is carried out before the applying, the first algorithm pretrained on an anatomical feature, and wherein the method is interrupted if the blood pressure parameter is outside of a predetermined range. If this is outside of the range which typically occurs with pulmonary vascular disease, the method is interrupted. Diagnostic accuracy is further increased by way of this embodiment of the invention, since false positive results can be avoided by incorporating the blood pressure parameter in the right atrium.

At least one embodiment of the invention further relates to a method for adjusting a first algorithm pretrained on an anatomical feature, comprising:

firstly receiving the first algorithm pretrained on an anatomical feature via a training interface;

secondly receiving, via the training interface, a first training data record which comprises image data of a blood vessel with a change in caliber;

thirdly receiving, via the training interface, a second training data record which includes image data of a blood vessel without a change in caliber; and adjusting the first algorithm, pretrained on an anatomical feature, based upon a comparison of the first training data record and the second training data record, via a training computing unit.

As described above, patient-based and/or synthetic training data can be used here.

At least one embodiment of the invention relates further to a method for producing synthetic training data. An input data record is provided here. Blood vessels are optionally segmented in the input data record. A change in caliber is then produced at a specific point in a blood vessel on the basis of a computer operation or calculation rule, in which the vessel geometry is changed at the specific point in the blood vessel, such that the caliber in the flow direction downstream is suddenly or discontinuously reduced to a lower value. The specific point is optionally determined randomly by a randomization function. The method can optionally be used to produce synthetic training data on a vascular tree, in other words on a system of number of vessels linked by way of branches in the manner of a tree. A plurality of changes in caliber is optionally produced in one vessel or in a vascular tree, wherein the number of changes in caliber is determined at random by the randomization function. The synthetic training data record is then provided. It can then be used for instance in the inventive method for adjusting pretrained algorithms.

At least one embodiment of the invention further relates to a device for detecting an anatomical feature of a section of a blood vessel, having the following features:

a first interface embodied to receive a medical image data record, comprising a region of an anatomy of a patient to be examined, which has a pulmonary artery;

a first computing unit, embodied to apply a first algorithm pretrained on an anatomical feature in order to detect the anatomical feature based upon the medical image data record; and a second interface embodied to provide an item of information, based on the detection of the anatomical feature;

wherein the anatomical feature comprises a change in caliber of a blood vessel.

According to one embodiment, the presence of the anatomical feature is indicative of pulmonary vascular disease, in particular a chronic thromboembolic pulmonary hypertension.

One such device can be embodied in particular to carry out at least one embodiment of the previously described inventive methods and their embodiments. In particular, the device can be embodied to carry out these methods and their embodiments, by the interfaces and the computing unit being embodied to carry out the corresponding method steps.

According to one embodiment of the invention, the device further has a second computing unit for segmenting a blood vessel and/or the right atrium of the heart in the medical image data record.

According to one embodiment of the invention, the device further comprises a third computing unit for determining a blood pressure parameter in a section of a blood vessel and/or in the right atrium of the heart in the region of the anatomy of the patient to be examined on the basis of the medical image data record.

At least one embodiment of the invention further relates to a training device for adjusting a pretrained algorithm for detecting an anatomical feature of a section of a blood vessel comprising a training interface embodied to firstly receive the pretrained algorithm, further embodied to secondly receive, via the training interface, a first training data record which comprises image data of a blood vessel with a change in caliber, further embodied to thirdly receive, via the training interface, a second training data record which comprises image data of a blood vessel without a change in caliber. The training system further has a training computing unit, embodied to adjust the first algorithm pretrained on an anatomical feature based upon a comparison of the first training data record and the training data record.

The devices of at least one embodiment of the invention can in particular be a computer, a microcontroller or an integrated circuit. Alternatively, they can be a cluster or cloud of computers.

An interface or training interface can be a hardware or software interface (for instance PCI bus, USB or Firewire) in at least one embodiment. A computing unit or training computing unit can have hardware elements or software elements, for instance a microprocessor or what is known as an FPGA (Field Programmable Gate Array).

At least one embodiment of the invention relates further to a computer program product with a computer program, which can be loaded directly into a memory of a device for detecting an anatomical feature of a section of a blood vessel and/or a training device for adjusting a first algorithm pretrained on an anatomical feature, having program sections in order to carry out all steps of the inventive method for detecting an anatomical feature of a section of a blood vessel and/or in order to carry out an embodiment of the inventive method for adjusting a first algorithm pretrained on an anatomical feature, when the program sections are carried out by the device and/or the training device.

A memory can be realized as a Random Access Memory (RAM) or as a permanent mass storage unit (hard disk, USB stick, SD card, solid state disk). According to at least one embodiment of the invention, the device or the training device can optimally further comprise an input and output unit, wherein an input and output unit comprises at least one input unit and/or at least one output unit.

The device and the training device according to at least one embodiment of the invention can be embodied as a shared system or be connected by way of a network. Furthermore, the communication between the device and the training device can also take place offline, for instance by exchanging data carriers. Communication between the device and the training device can consist, for instance, in the device transmitting further training data to the training device, or the training device transmitting the trained or further adjusted algorithm to the device. Furthermore, the device and the training device can be connected to other data sources or networks, in particular to a local or distributed PACS (Picture Archiving and Communication System), RIS (Radiology Information System) or HIS (Hospital Information System).

A network can be a local area network (LAN) or a wide-area network (WAN). One example of a local area network is an intranet, one example of a wide-area network is the internet. The network NETW can in particular also be embodied wirelessly, in particular as a wireless LAN (WLAN) or in brief WiFi, or as a Bluetooth connection. The network can also be embodied as a combination of the cited examples.

At least one embodiment of the invention further relates to a computer-readable storage medium, on which program sections which can be read and carried out by a computer are stored, in order to carry out all the method of at least one embodiment, when the program sections are carried out in a computer.

FIG. 1 shows a schematic diagram of a normal vascular tree 1. Arrow A specifies the flow direction. The schematic diagram shows a schematic representation of the lumen of the vessels. The vascular tree 1 is an example cutout of the pulmonary artery system and has a first blood vessel 3 in a region b upstream of a branching 5. In region b, the blood vessel 3 has a substantially constant internal diameter r1. Two smaller blood vessels 7 and 9 with an internal diameter r2 or r3 extend downstream from the branching 5. In this regard r1>r2, r1>r3 and r1<(r2+r3). FIG. 1 reproduces the ratios in a healthy vascular tree with a branching.

Figure 2:
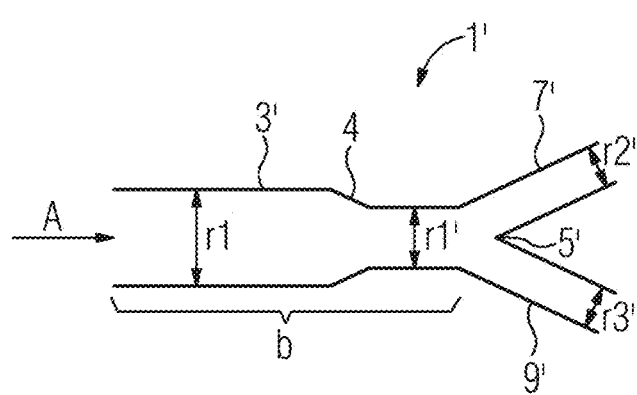
FIG. 2 a schematic diagram of a blood vessel with a change in caliber.

FIG. 2 shows a schematic diagram of a pathologically changed vascular tree 1' with a change in caliber 4. Arrow A specifies the flow direction. The schematic diagram shows a schematic representation of the lumen of the vessels. The vascular tree 1' is an example cutout of the pulmonary artery system, such as would be found in a CTEPH patient, and has a first blood vessel 3' in a region b upstream of a branching 5'. In region b, the blood vessel 3' has no constant internal diameter. Upstream of the change in caliber 4, the blood vessel 3' has the internal diameter r1. Downstream of the change in caliber 4, the blood vessel 3' has the internal diameter r1'. r1<r1' applies here. The internal diameter changes discontinuously or suddenly on account of the change in caliber 4. Changes in caliber of this type occur with the CTEPH disease as a result of thrombotic deposits on the inner vascular wall.

Figure 3:
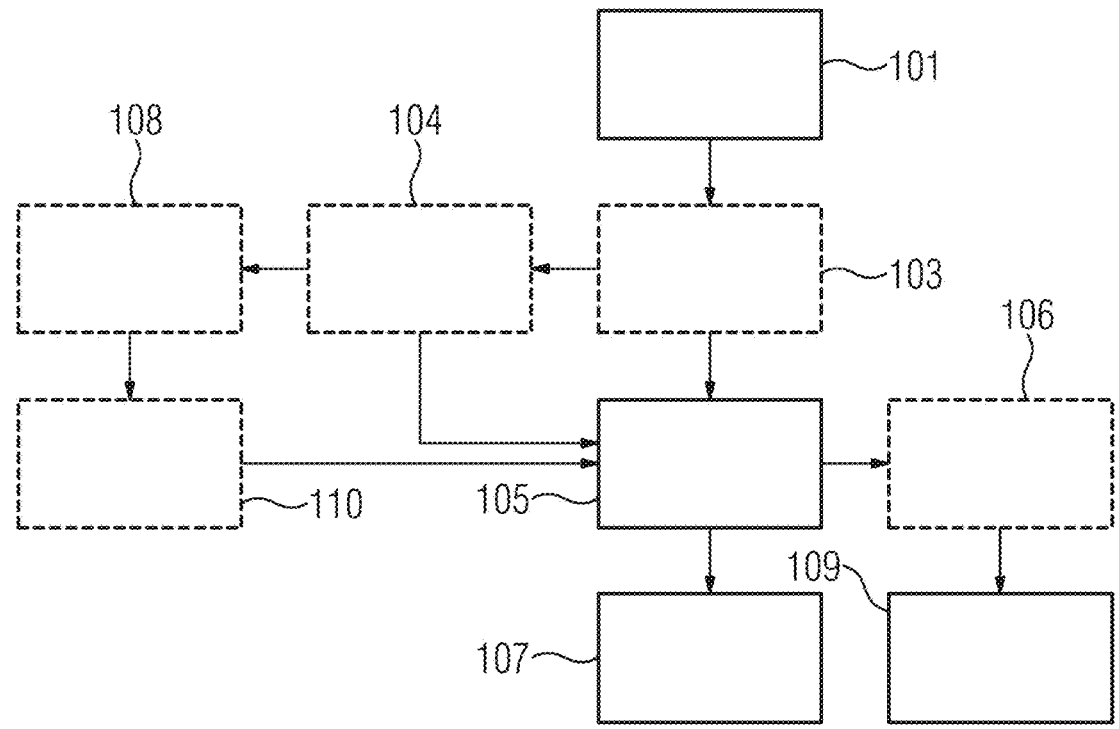
FIG. 3 a flow diagram of an embodiment of the inventive method for detecting an anatomical feature of a section of a blood vessel.

FIG. 3 shows a course of an embodiment of the inventive method for detecting an anatomical feature of a section of a blood vessel. In a provisioning step 101, a medical image data record, e.g. a CT image data record, is provided.

This is analyzed by the step of applying 105 a first algorithm pretrained on the anatomical feature in order to detect the anatomical feature. An item of information is then provided 107, which is based on the detection of the anatomical feature; wherein the anatomical feature comprises a change in caliber of a blood vessel. This information specifies, for instance, whether or not sections of blood vessels have been detected in the medical image data record. The information can optionally contain a report to determine whether and how many changes in caliber have been detected and where these are located. In the image data record, detected changes in caliber can optionally be indicated or marked directly.

The blood vessels are optionally segmented 103 in the medical image data record. Therefore the further analysis can take place on the basis of image data, for instance, which relates in particular or exclusively to the segmented blood vessels.

A blood pressure parameter is optionally determined 104 in one section of a blood vessel. This step 104 can, other than as shown in the present example, also take place following the step of applying 105 a first algorithm pretrained on the anatomical feature in order to detect the anatomical feature, for instance intentionally for blood vessels in which a change in caliber has been detected.

The right atrium of the heart is optionally also segmented 108; based on this data a blood pressure parameter in the right atrium can be determined in step 110. This step 108 can, other than as shown in the present example, also take place independently of the implementation of steps 103 and/or 104. If the blood pressure parameter of the right atrium lies outside of the range expected in the case of pulmonary hypertension for instance, the method in accordance with step 110 can optionally be interrupted since this could indicate image or computer artifacts or an inadequate image data record.

A blood pressure parameter in the right atrium and the pulmonary artery leaving the same is in particular also optionally detected in step (106) and output (109).

Figure 4:
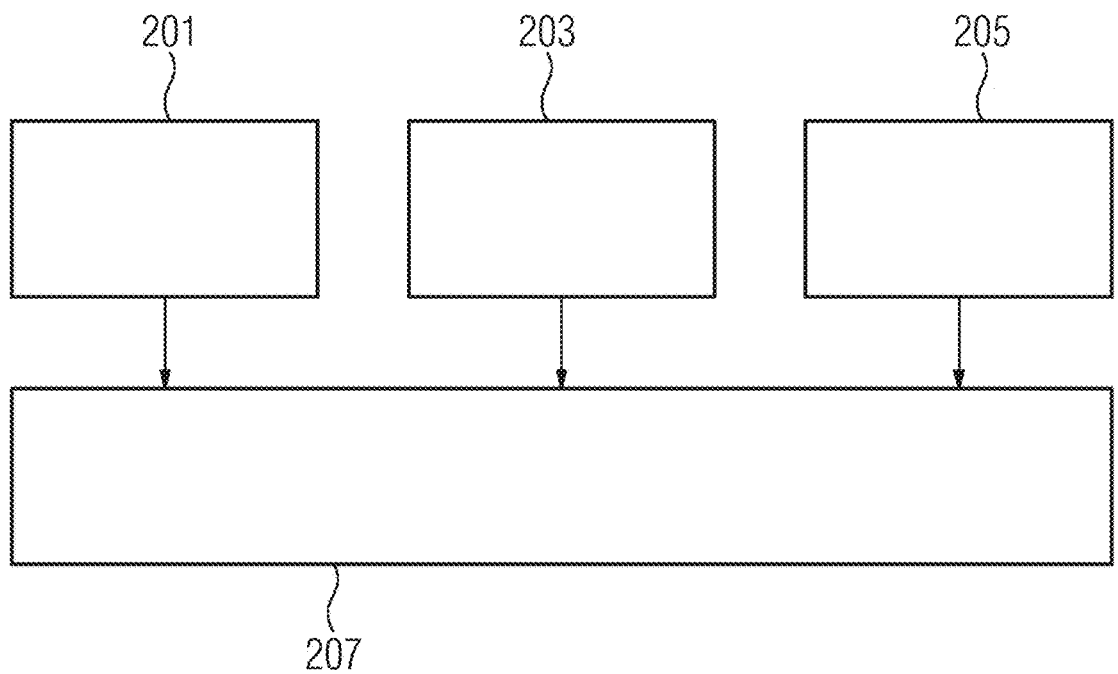
FIG. 4 a flow diagram of an embodiment of the inventive method for adjusting a first algorithm pretrained on an anatomical feature.

FIG. 4 shows a course of the inventive method for adjusting a first algorithm pretrained on an anatomical feature. A training interface is used in step 201 to receive a first algorithm pretrained on an anatomical feature. Furthermore, the training interface is used in step 203 to receive a first training data record which comprises image data of a blood vessel with a change in caliber, and in step 205 to receive a second training data record which comprises image data of a blood vessel without a change in caliber. A step of adjusting (207) the first algorithm pretrained on an anatomical feature follows on the basis of a comparison of the first training data record and the second training data record of a training computing unit. In this regard, data records can be used as training data records, which are based on patient-based and synthetic image data, or comprise patient-based and synthetic image data, wherein at least one subset of the plurality of training data records comprises image data of a blood vessel with a change in caliber.

Figure 5:
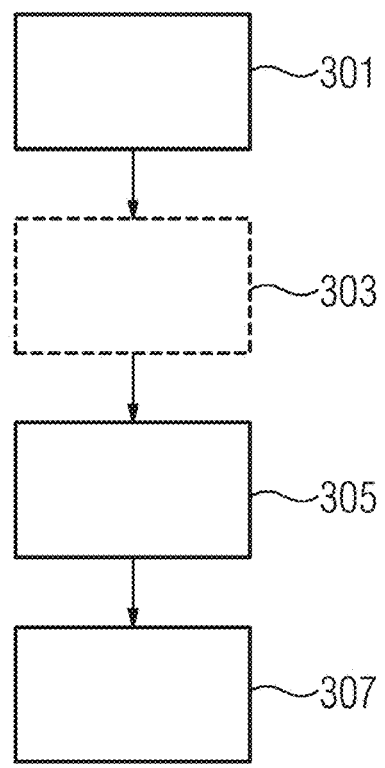
FIG. 5 a flow diagram of an embodiment of the inventive method for generating synthetic training data.

FIG. 5 shows a course of an embodiment of the inventive method for generating synthetic training data. In this regard, an input data record is provided in step 301, which is based on medical image data or comprises medical image data, which comprises a region of the anatomy which has sections of blood vessel or blood vessels. Blood vessels are optionally segmented in the input data record in a step 303. A change in caliber is then produced in step 305 at a specific point in a blood vessel on the basis of a computer operation or calculation rule, in which the vascular geometry is changed at the specific point in the blood vessel such that the caliber in the flow direction downstream is suddenly or discontinuously reduced to a lower value. The specific point is optionally determined at random by a randomization function.

The method can optionally be used to produce synthetic training data on a vascular tree, in other words on a system of a number of vessels linked by way of branches in the manner of a tree. A plurality of changes in diameter is optionally produced in one vessel or in a vascular tree, wherein the number of changes in caliber is determined at random by the randomization function. The synthetic training data record is then provided in a step 307. A pretrained algorithm can then be used for instance in the inventive method for adjusting.

Figure 6:
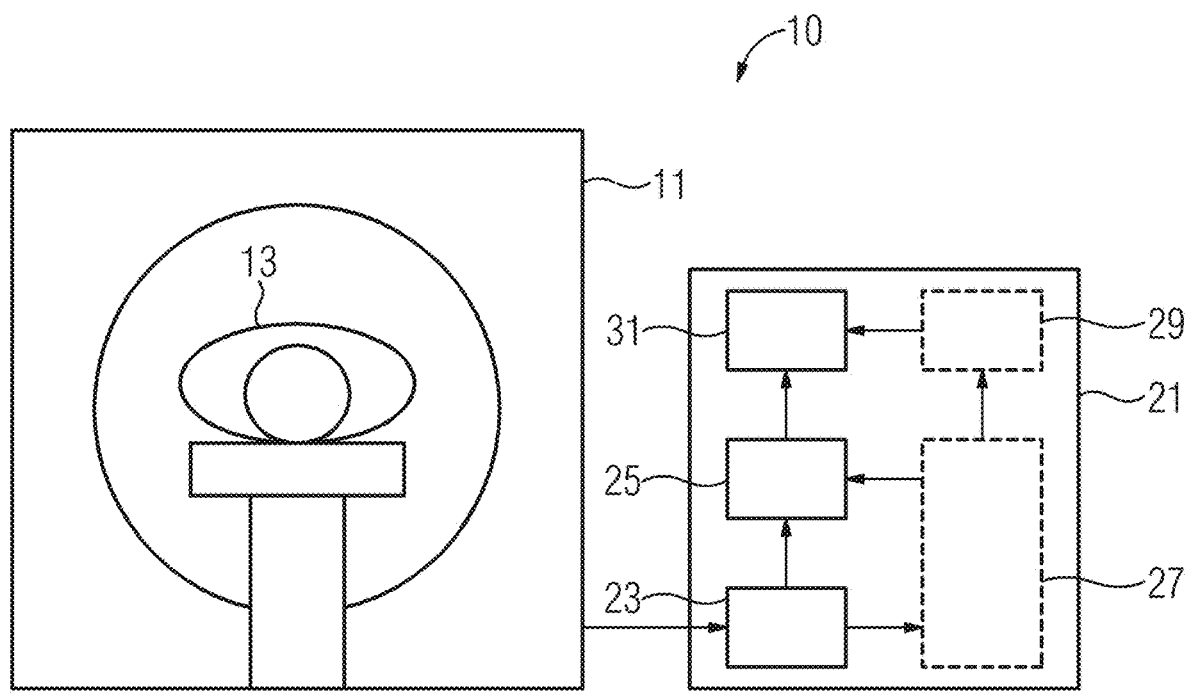
FIG. 6 a computed tomography device having an embodiment of an inventive device.

FIG. 6 shows an arrangement 10 with a computed tomography device 11 and an embodiment of the inventive device 21 for detecting an anatomical feature of a section of a blood vessel. The computed tomography device 11 is embodied to detect image data of at least one subarea of a patient 13 and to provide a medical image data record by way of a first interface 23. The first interface 23 is embodied to receive the medical image data record, comprising a region of an anatomy of a patient to be examined, which has the section of a blood vessel. The medical image data record can be generated from a thorax CT recording of a patient, for instance, and comprise image data of the heart and the lungs. In a first computing unit 25, a first algorithm pretrained on an anatomical feature is applied, in order to analyze the image data with respect to the presence of the anatomical feature, which comprises a change in caliber of a blood vessel. An item of information as to whether and (optionally) how many blood vessels are with a change in caliber are present is provided by way of a second interface 31. A second computing unit 27 is optionally available for segmenting a blood vessel and/or the right atrium of the heart in the medical image data record. In this case the analysis with respect to the presence of the anatomical feature can take place in the first computing unit 25 on the basis of segmented image data provided by the second computing unit 27.

Furthermore, a third computing unit 29 can optionally access segmented image data provided by the second computing unit 27 in order to determine a blood pressure parameter in a blood vessel and/or in the right atrium of the heart. This determination can be determined, as already explained, with a flow calculation on the basis of the medical image data, e.g. by way of a fluid flow simulation (computational fluid dynamics). Alternatively, the blood pressure parameter can be determined by using a further pretrained algorithm.

The calculated blood pressure parameter can be provided by way of the second interface 31 (or alternatively by way of a third interface, not shown in FIG. 6). Furthermore, the calculated blood pressure parameter can optionally be checked to determine whether it lies in a range expected for specific vascular diseases. If it lies outside of the specific range, the result can be provided accordingly with a notification or, optionally, the analysis method can be interrupted in order to detect the anatomical feature of the section of a blood vessel.

An embodiment of the inventive device 21 with its components can be implemented in the form of a computer program product, which is loaded directly into a memory of the device, wherein the described steps are then implemented using software. Furthermore, the device 21 can be embodied directly in a control unit of a medical imaging device, e.g. as here, of a CT device 11 or in a network with distributed components or functions.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for detecting an anatomical feature of a section of a blood vessel, the method comprising:
   providing a medical image data record, the medical image data record including a region of an anatomy of a patient to be examined, the region of the anatomy of the patient including the section of the blood vessel;
   applying a first machine learning algorithm to detect the anatomical feature based on the medical image data record, the first machine learning algorithm being pretrained on the anatomical feature; and
   providing an item of information based on detection of the anatomical feature, the anatomical feature including a change in caliber of the blood vessel, wherein
      the section of the blood vessel is a section of a pulmonary artery,
      presence of the anatomical feature is indicative of chronic thromboembolic pulmonary hypertension (CTEPH), and
      the change in caliber of the blood vessel includes a change in an internal diameter or free lumen of the section of the blood vessel downstream in a blood flow direction, such that the internal diameter or free lumen of the section of the blood vessel in the blood flow direction becomes constant or smaller, but not larger.

2. The method of claim 1, further comprising:
   segmenting the blood vessel in the medical image data record, and wherein
      the first machine learning algorithm is applied to image data relating to the segmented blood vessel.

3. The method of claim 1, wherein
   the first machine learning algorithm is trained on a plurality of training data records,
   the plurality of training data records include patient-based image data and synthetic image data, and
   at least one subset of the plurality of training data records includes image data of a blood vessel with a change in caliber.

4. The method of claim 3, wherein the plurality of training data records include image data relating to a segmented blood vessel.

5. The method of claim 2, wherein
   the first machine learning algorithm is trained on a plurality of training data records,
   the plurality of training data records include synthetic image data, and
   the synthetic image data is based on patient-based image data of a blood vessel with a change in caliber inserted into the blood vessel.

6. The method of claim 1, further comprising:
   determining a blood pressure parameter in the section of the blood vessel, based on the medical image data record.

7. The method of claim 1, further comprising:
   segmenting a right atrium of a heart of the patient in the medical image data record;
   determining a blood pressure parameter in the right atrium; and
   determining whether the blood pressure parameter is within a range indicative of pulmonary vascular disease.

8. The method of claim 7, wherein
   the determining whether the blood pressure parameter is within the range is performed before the applying of the first machine learning algorithm, and
   the method is interrupted in response to the blood pressure parameter being outside of the range.

9. A method for adjusting a first machine learning algorithm pretrained on an anatomical feature, the method comprising:
   receiving, via a training interface, the first machine learning algorithm pretrained on the anatomical feature;
   receiving, via the training interface, a first training data record including image data of a first blood vessel with a change in caliber;
   receiving, via the training interface, a second training data record including image data of a second blood vessel without a change in caliber; and
   adjusting the first machine learning algorithm based on a comparison of the first training data record and the second training data record, via a training computing unit, wherein
      the first blood vessel and the second blood vessel are pulmonary arteries,
      presence of the anatomical feature is indicative of chronic thromboembolic pulmonary hypertension (CTEPH), and
      the change in caliber of the first blood vessel includes a change in an internal diameter or free lumen of a section of the first blood vessel downstream in a blood flow direction, such that the internal diameter or free lumen of the section of the first blood vessel in the blood flow direction becomes constant or smaller, but not larger.

10. A device for detecting an anatomical feature of a section of a blood vessel, the device comprising:
    a first interface configured to receive a medical image data record including a region of an anatomy of a patient to be examined, the region including the section of the blood vessel;
    at least one first processor configured to apply a first machine learning algorithm to detect an anatomical feature based on the medical image data record, the first machine learning algorithm being pretrained on the anatomical feature; and
    a second interface configured to provide an item of information based on detection of the anatomical feature; wherein
       the anatomical feature includes a change in caliber of the blood vessel,
       the section of the blood vessel is a section of a pulmonary artery,
       presence of the anatomical feature is indicative of chronic thromboembolic pulmonary hypertension (CTEPH), and
       the change in caliber of the blood vessel includes a change in an internal diameter or free lumen of the section of the blood vessel downstream in a blood flow direction, such that the internal diameter or free lumen of the section of the blood vessel in the blood flow direction becomes constant or smaller, but not larger.

11. The device of claim 10, further comprising:
    at least one second processor configured to segment, in the medical image data record, at least one of the blood vessel or a right atrium of a heart of the patient.

12. The device of claim 11, further comprising:
at least one third processor configured to determine, based on the medical image data record, a blood pressure parameter in at least one of the section of the blood vessel or in the right atrium of the heart in the region of the anatomy of the patient.

13. A non-transitory computer program product storing a computer program, directly loadable into a memory of at least one of a device for detecting an anatomical feature of a section of a blood vessel or a training device for adjusting a first machine learning algorithm pretrained on the anatomical feature, the computer program including program sections to carry out the method of claim 1, when the program sections are executed by the at least one of the device or the training device.

14. A non-transitory machine-readable storage medium, storing program sections of a program, readable and executable by a computer to carry out the method of claim 1, when the program sections are carried out in the computer.

15. The method of claim 3, wherein
the first machine learning algorithm is trained on a plurality of training data records,
the plurality of training data records include synthetic image data, and
the synthetic image data is based on patient-based image data of a blood vessel with a change in caliber inserted into the blood vessel.

16. A non-transitory computer program product storing a computer program, directly loadable into a memory of at least one of a device for detecting an anatomical feature of a section of a blood vessel or a training device for adjusting a first machine learning algorithm pretrained on the anatomical feature, the computer program including program sections to carry out the method of claim 9, when the program sections are executed by the at least one of the device or the training device.

17. A method for directing an anatomical feature of a section of a blood vessel, the method comprising:
providing a medical image data record, the medical image data record including a region of an anatomy of a patient to be examined, the region of the anatomy of the patient including the section of the blood vessel;
applying a first machine learning algorithm to detect the anatomical feature based on the medical image data record, the first machine learning algorithm being pretrained on the anatomical feature:
providing an item of information based on detection of the anatomical feature, the anatomical feature including a change in caliber of the blood vessel;
determining a blood pressure parameter in a portion of a heart of the patient based on the medical image data record; and
determining whether the medical image data record is adequate for detecting the anatomical feature based on whether the blood pressure parameter is within a range indicative of a pulmonary vascular disease, wherein
the first machine learning algorithm is applied in response to determining that the medical image data record is adequate.

* * * * *